Aug. 24, 1965  T. A. CHUBB  3,202,382
ROCKET YAW CONE REDUCTION DEVICE
Filed April 30, 1963  3 Sheets-Sheet 2
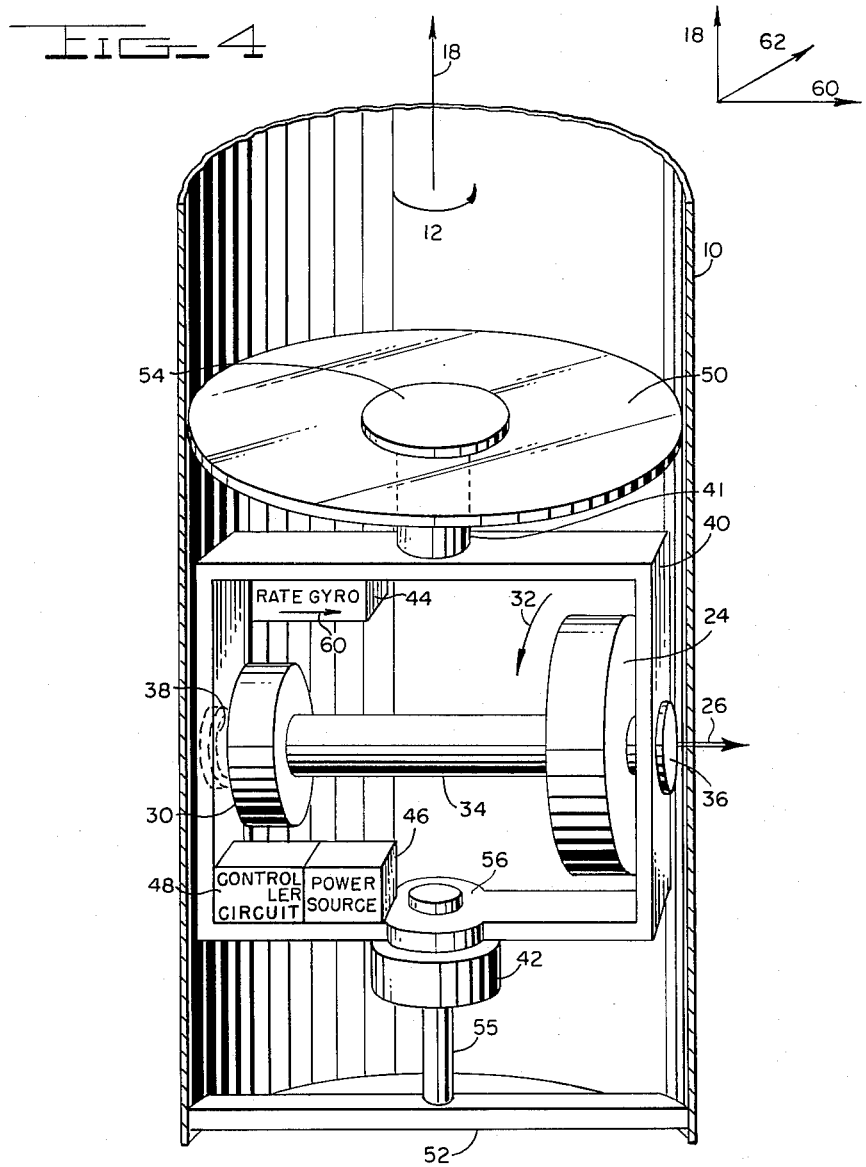
INVENTOR
TALBOT A. CHUBB
AGENT
BY
ATTORNEY Aug. 24, 1965  T. A. CHUBB  3,202,382
ROCKET YAW CONE REDUCTION DEVICE
Filed April 30, 1963  3 Sheets—Sheet 3
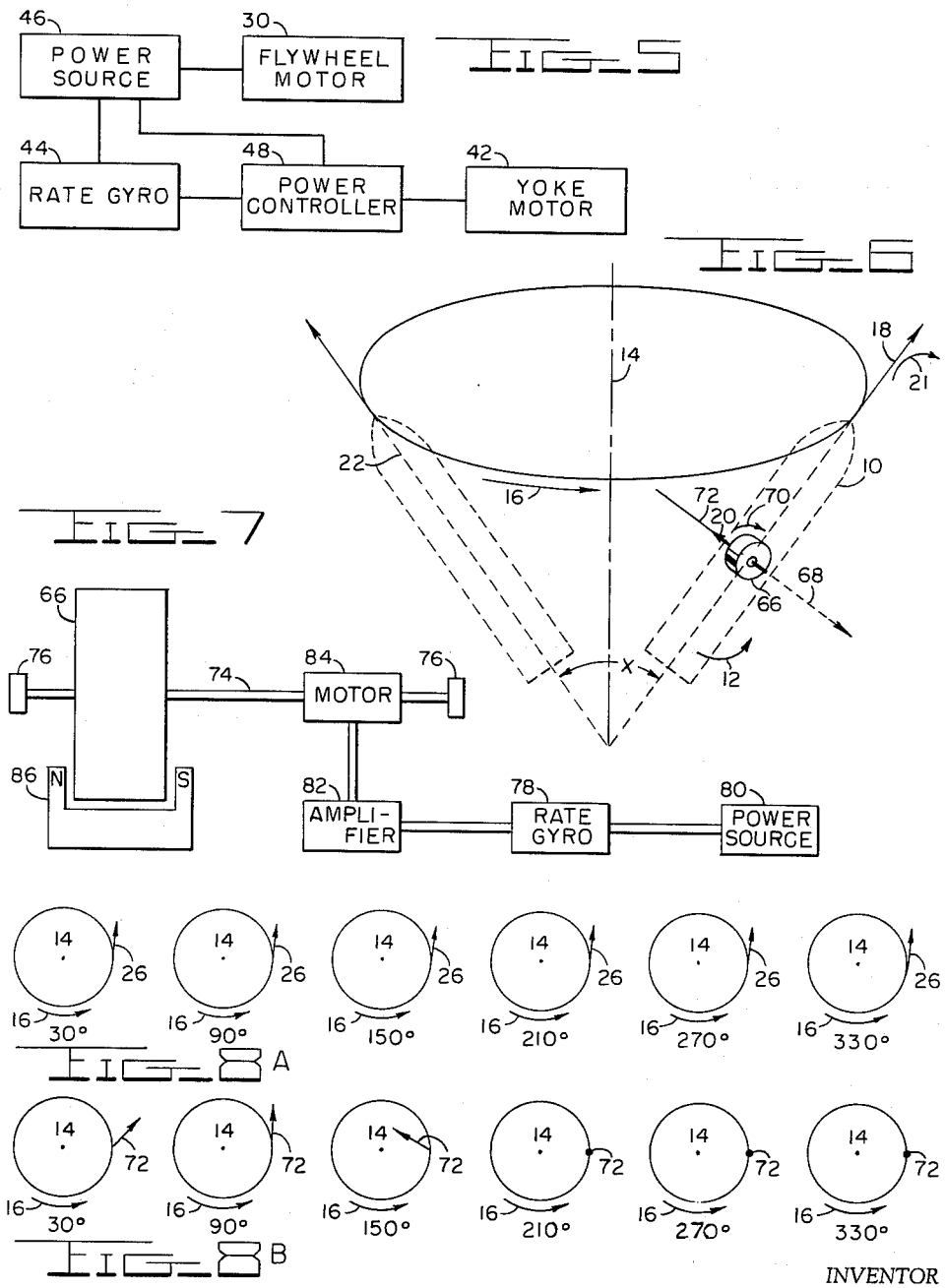
INVENTOR
TALBOT A. CHUBB
AGENT
BY
ATTORNEY United States Patent Office 3,202,382
Patented Aug. 24, 1965

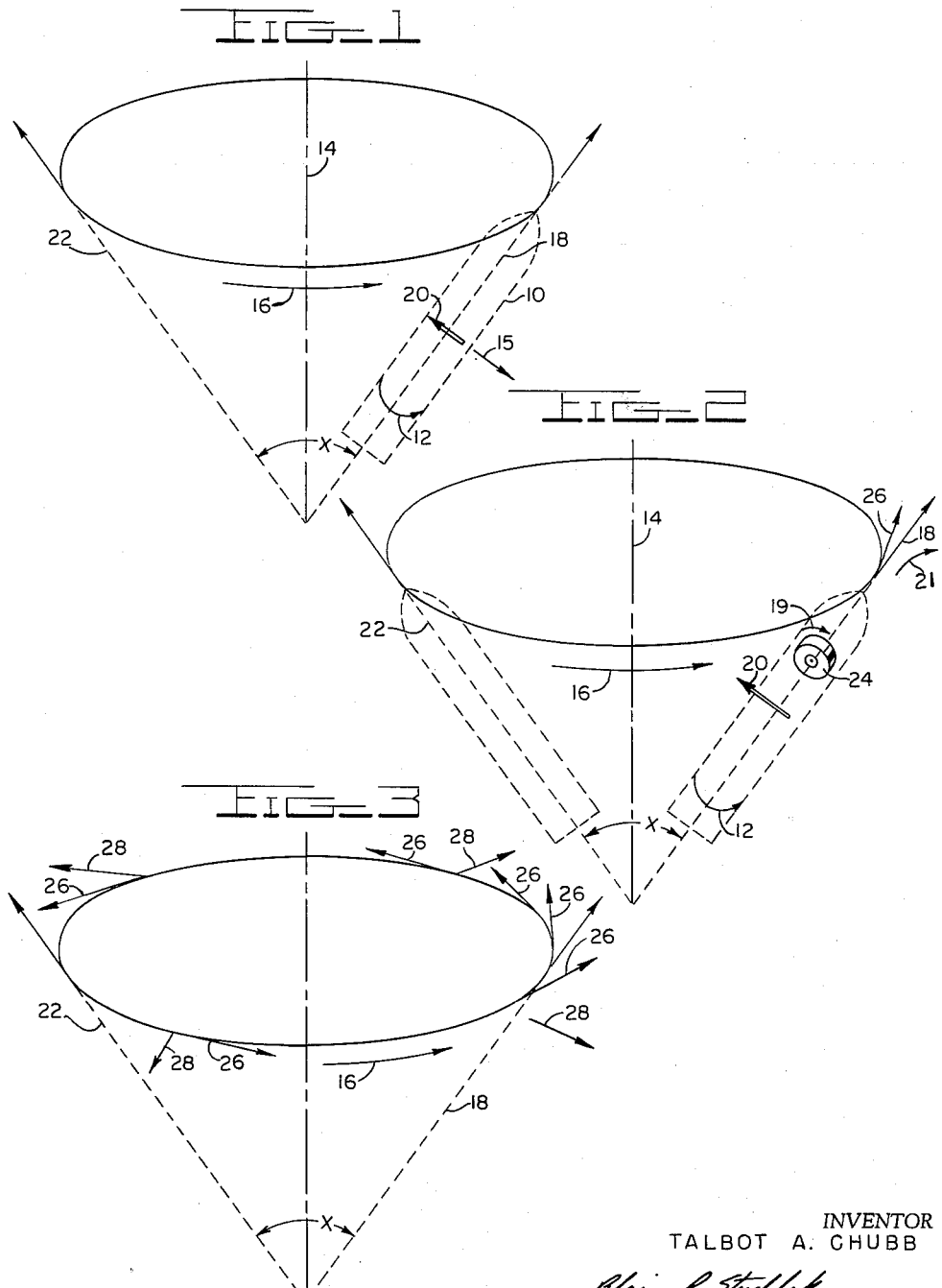

3,202,382
ROCKET YAW CONE REDUCTION DEVICE
Talbot A. Chubb, Arlington, Va., assignor to the United States of America as represented by the Secretary of the Navy
Filed Apr. 30, 1963, Ser. No. 277,057
5 Claims. (Cl. 244—14)

The invention described herein may be manufactured and used by or for the Government of the United States of America for governmental purposes without the payment of any royalties thereon or therefor.

This application is a continuation-in-part of application Serial No. 120,799, filed June 29, 1961, for a "Rocket Stabilizer," now abandoned.

This invention relates in general to stabilizers and more particularly to rocket stabilizers for controlling the behavoir of spinning rockets.

It is especially desirable in the control of rockets above the earth's atmosphere to have a means within an unguided rigid rocket for controlling to some degree the motion of the rocket. In general, the motion of an unguided rigid body above the earth's atmosphere is governed by the laws of rigid body mechanics. When viewed in a coordinate frame moving with the rocket's center of mass, a rocket above the earth's atmosphere will spin about its longitudinal axes and at the same time precess about the center of a cone which is generally referred to as the yaw cone. In practice, precession with a very wide yaw cone is a very frequently encountered condition in unguided, fin stabilized rockets. It is a mode of behavior which adversely affects many of the operations for which a rocket is used. In addition, the development of a wide angle yaw cone usually occurs before the rocket has completely traversed the earth's atmosphere, and as a result, since the rocket then flies broadside through the atmosphere, additional air drag is encountered and rocket peak altitude reduced.

The prior art contains a variety of control systems for craft operable in space. These systems are operable through an external application of force to the rocket or space craft, either by rudder or aileron or elevator surfaces which require the existence of a fluid medium, such as the earth's atmosphere, about a body upon which the exterior surfaces may react, or by the application of external forces produced by jetting gases which must be carried in the rocket for this purpose. These methods of controlling the craft are either not applicable in outer space beyond the earth's atmosphere or they cost a considerable penalty in payload weight. Gas jetting systems additionally pose a problem in contamination or alteration of the atmosphere around the rocket, a problem which is important when the rocket is being used to study this same atmosphere. It is to this problem of rocket stabilization in space without utilizing gas jetting that the present invention is directed.

Accordingly, it is an object of the present invention to provide a method and means for controlling spinning rockets wherein said means is contained within the rocket body.

It is another object of the present invention to provide a method and means for controlling the behavior of spinning rockets which will not alter the axis of the rocket's yaw cone.

It is a further object of the present invention to provide a method and means for controlling the behavior of spinning rockets which are responsive to the rocket's instantaneous attitude.

It is still a further object of the present invention to provide means for controlling the spin of rockets which acts to reduce the angle of the yaw cone.

It is still a further object of the present invention to provide means for controlling the behavior of spinning rockets which does not alter the total angular momentum of the rocket but merely maximizes the spin energy of the rocket subject to the condition of a fixed total angular momentum.

Other objects and advantages of this invention will become apparent upon a careful consideration of the following description, when read in conjunction with the accompanying drawings in which like reference characters will designate like parts throughout the figures thereof and wherein:

FIG. 1 is a schematic illustrating the precession cone traced out by the tip of a spinning and precessing rocket in free space as viewed from a non-rotating coordinate system moving with the center of mass of the rocket.

FIG. 2 is a simplified schematic diagram of one embodiment of the invention.

FIG. 3 is a vector diagram which shows the long period sequential orientation of the angular momentum vector of the rotating flywheel of the embodiment of FIG. 2.

FIG. 4 is a schematic diagram of the embodiment of FIG. 2 in greater detail.

FIG. 5 illustrates by a block diagram the electrical components involved in the embodiment of FIG. 4.

FIG. 6 is a schematic diagram of another embodiment of the invention.

FIG. 7 illustrates by a block diagram the physical and electrical components involved in the embodiment of FIG. 6.

FIG. 8a is a series of vector diagrams illustrating the short period sequential orientation of the angular momentum vector of the flywheel of the embodiment of FIG. 4.

FIG. 8b is a series of vector diagrams illustrating the short period sequential orientation of the angular momentum vector of the flywheel of the embodiment of FIG. 7.

FIG. 1 demonstrates the spin-precession behavior of a rotating rigid object of cylindrical geometry falling free in empty space. In considering the spin precession behavior of such an object it is customary to consider only motion relative to the center of mass of the object. The motion of the center of mass through space is not the concern of this invention. The invention is concerned only with the orientations and rotations of the vehicle relative to its center of mass and hence all motion will be considered relative to this moving frame of reference. In these terms a spinning rocket type object moves in a combination spin and precession motion as shown in FIG. 1. If the rocket 10 spins in the direction sense of curved arrow 12, it will also gradually precess around its total angular momentum vector 14 in the precession direction 16. Using the right hand rule convention for associating a vector with a sense of rotation, the rocket's motion may be described as an instantaneous rotation about spin angular velocity vector 18 combined with an instantaneous tumble type rotation about vector 20, where vector 20 is a vector perpendicular to vector 18 which lies in the plane defined by vector 18 and rocket total angular momentum vector 14. Vector 20 is called the rocket tumble or transverse angular velocity vector. Indeed the total angular momentum vector 14 is precisely made up of the sum of the spin angular momentum vector 18, and the tumble angular momentum vector 20. The longitudinal axis of the rocket can thus be said to trace out a cone during one complete precession cycle. This free precession cone is often referred to as the rocket yaw cone and is not to be confused with coning motion produced by the application of external torque to a spinning gyroscope. As shown in FIG. 1 vector 22 depicts the instantaneous position of the rocket spin axis at the completion of one-half the yaw period, while angle $x$ is defined as the angle of the yaw cone. This free precession cone depicted in FIG. 1 occurs when no external torque is applied to the spinning rocket and is a consequence of the total angular momentum vector associated with the rocket's motion being not aligned with a principle moment of inertia in the rocket.

The invention disclosed herein is, stated generally, a mechanism which operates to reduce the yaw cone angle $x$, of a spinning and precessing rocket, without exerting external torques on the rocket.

The embodiment of FIGS. 2-5 accomplishes reduction of the yaw cone angle by transferring some of the angular momentum of the rocket about an axis perpendicular to the longitudinal axis of the rocket into angular momentum about said longitudinal axis of the rocket. This process is carried out by means of a reaction torque produced on the rocket during the process of applying torque to a flywheel. Torque is applied to the flywheel so as to keep the flywheel angular momentum vector pointing tangent to the curve traced by the tip of the rocket as it precesses about the yaw cone.

The principle by which the present invention operates is illustrated in FIGS. 2 and 3. Referring now to FIG. 2 the flywheel 24 is mounted on a gimbal support which is motor driven against the spin rotation of the rocket so that said flywheel does not partake of the spin of the rocket. Said gimbal support is driven in such a manner that the axis of flywheel 24 is continuously maintained tangent to the precession path 16 of the rocket tip and perpendicular to the plane defined by total angular momentum vector 14 and spin angular momentum vector 18. The direction of the angular momentum vector associated with rotating flywheel 24 is chosen in accordance with the right hand convention and is forced to point along the precession circle in the forward direction as illustrated by vector 26 in FIG. 3.

The means by which the invention operates to reduce the precession cone angle $x$ is analyzed as follows: Consider the torques which must be applied to flywheel 24 to maintain the above-described motion. Referring to FIG. 3, since the above motion requires the flywheel angular momentum vector 26 to continuously and uniformly change in direction through an angle of 360° each precession period, and since said flywheel angular momentum vector describes this motion in such a manner that it remains at all times in a plane perpendicular to the total rocket angular momentum vector direction 14, then the flywheel must be subject to a constant torque in said plane. The direction of the torque is that of a vector pointing from the rocket tip toward the axis 14 of the precession cone.

Since, in the embodiment of the invention shown in FIGS. 2-5, motor torquing means within the rocket are provided for maintaining the flywheel angular momentum vector along the forward precession direction, as indicated in FIG. 2, then said flywheel must exert on the rocket a torque opposite in magnitude and direction to that required to maintain flywheel orientation. The direction of said torque is that of vector 28 of FIG. 3. Torque vector 28 is in a plane perpendicular to total angular momentum direction 14 and directed radially away therefrom. Torque vector 28 has two components, one component along the longitudinal axis of rocket 10, in a direction such as to increase the spin angular velocity and spin angular momentum of the rocket, the other component perpendicular to the longitudinal axis of the rocket and in such a direction as to oppose the tumble rotation 20 of the rocket body. This second component of torque reduces the tumble component of the rocket's angular momentum.

From the foregoing it will be apparent that if a device is located completely inside a free precession rocket, which device causes a flywheel inside said rocket to rotate at a constant magnitude of angular velocity and maintains the orientation of the angular momentum vector of said flywheel in a direction tangent to the free precession path of the rocket tip, then said device will result in an increasing rate of rocket spin as measured about its longitudinal axis and also a decreasing rate of rocket tumble as measured by instantaneous angular rotation rate perpendicular to said axis. Stated previously herein, the spin angular momentum vector is along the axis of the rocket which traces out a cone during one complete precession cycle and the tumble angular momentum vector 20 is at a right angle thereto toward the cone axis, then the sum of the two vectors 18 and 20 makes up the total angular momentum vector 14, as shown in FIGS. 1 and 2. Vectors 18, 20 and 14 then form a triangle having an angle $$\frac{x}{2}$$

Since the precession cone angle $x$ is related to the magnitudes of the rocket tumble angular momentum and the rocket spin angular momentum by the following mathematical law:

$$\operatorname{Tan}\frac{x}{2} = \frac{\text{tumble angular momentum}}{\text{spin angular momentum}}$$

said device results in a continuous decrease in cone angle $x$. Since said device is internal to the rocket, no external torques are applied to the combined system of rocket and flywheel, and hence the total angular momentum of the combined system, rocket plus flywheel, remains unchanged during the process of cone collapse.

FIG. 4 illustrates one means by which desired flywheel orientation is achieved and maintained. In FIG. 4, flywheel 24 is driven by the constant speed flywheel motor 30 in a positive direction as indicated by curved arrow 32 which results in the existence of flywheel angular moment vector 26. Flywheel 24 is mounted on shaft 34 which passes through bearings 36 and 38 of gimbaled yoke 40. Also mounted to gimbaled yoke 40 is the housing of flywheel motor 30, yoke motor 42, rate gyro 44, battery power source 46 and power controller circuit 48.

Yoke 40 is mounted for rotation on support 50 by means of a yoke extension 41 passing through bearing 54 located in the center of support 50. At the midpoint of support 52 there is rigidly attached axle 55 which serves as the armature axle of yoke motor 42 and which passes through yoke 40 by means of bearing 56. Hence gimbaled yoke 40 is free to rotate around an axis parallel to the longitudinal axis 18 of rocket body 10. Moreover yoke motor 42 is wired so that when a positive voltage is applied thereto, axle 55 is torqued in a direction to rotate support 52 and attached rocket case 10 in the direction designated by curved arrow 12. In reaction gimbaled yoke 40 is torqued to rotate in the −12 direction. The rate gyro 44, which is the only sensor employed in the assembly, is oriented so as to measure its rate of rotation around axis 60, which is parallel to vector 26. Rate gyro 44 is wired to produce a positive output voltage when the tumble angular momentum vector is in the +60 direction, as defined by the right hand convention, and a negative output voltage when said vector is in a —60 direction. Consider right hand vectors 60, 62, and 18, shown in FIG. 4 to be rigidly attached to yoke 40. Rate gyro 44 does not respond to rotation about axis 18 or to rotation about axis 62, which is perpendicular to axis 18 and axis 60.

Electrical signal connections are shown in FIG. 5. Power controller 48 amplifies the sensing signal produced by rate gyro 44 and applies it without change in sign to provide driving power for yoke motor 42. Power source 46 provides power to rate gyro 44, flywheel motor 30 and yoke motor 42.

The rocket stabilizer assembly operates in the following manner. Power is applied continuously to flywheel motor 30 inducing approximately constant spin direction 32. As a result of flywheel angular momentum and of the low friction gimbal bearings 54 and 56, yoke 40 does not partake significantly of rocket spin, which is about vector 18. To reduce cone angle $x$ the flywheel angular momentum vector must be maintained tangent to precession cone. Consider now what happens if the flywheel axis and angular momentum vector 26 moves to a position pointing in the general direction of rocket total angular momentum vector 14. This condition means that vector axis 60 is oriented roughly in the direction of the tumble component of the rocket's angular momentum vector 20. Hence rate gyro 44 is being rotated about axis 60 in a positive direction and generates a positive voltage output signal. Voltage controller 48 amplifies said positive voltage and applies a positive power voltage to yoke motor 42, which in turn torques axle 55 and hence rocket case 10 in the +18 direction thereby increasing rocket spin in the direction shown by arrow 12. The counter or reaction torque applied to gimbaled yoke 40 and hence to flywheel 24 is in the —12 direction by the right hand rule and hence tries to precess the flywheel angular momentum vector 26 in the —18 direction as required by Newton's law of reaction as it applies to rotary motion. The direction of the angular momentum vector of the flywheel is in the +60 direction relative to the rocket, roughly the +14 direction in space. The —18 direction is perpendicular to the +60 direction, thus the condition for precession instead of the condition for spin-up is had. The direction of precession is the —18 direction, and precession of the flywheel angular momentum in the —18 direction would occur if the axle of the flywheel were gimballed so that the required change in direction of the flywheel axis could occur. However, flywheel bearings 36 and 38 prevent the flywheel axle and associated angular momentum vector from dipping towards the —18 direction. The force applied to the axle is in the +18 direction at bearing 36 and in the —18 direction at bearing 38. These bearing forces are equivalent to a torque in the —62 direction being applied to flywheel 24 thus precessing flywheel angular momentum vector 26 in the —62 direction. Precession in the 62 direction is permitted by gimbal bearings 54 and 56 and rotates angular momentum vector 26 from a direction approximating rocket tumble angular momentum vector 20 toward precession path 16 of the rocket. If vector 26 were to pass the forward precession path 16, then rate gyro 44 would sense rotation in the —60 direction, which in turn would result in powering yoke motor 42 in the opposite direction resulting in precession of vector 26 back toward precession path 16. As can be seen from the foregoing a stable equilibrium condition is achieved and maintained in which the flywheel angular momentum vector is substantially maintained pointing along the forward precession path of the rocket tip thereby resulting in continual reduction in the cone angle $x$ of the rocket free precession cone.

Referring now to the embodiment of FIGS. 6 and 7 there is shown a flywheel 66 mounted about an axis 68 which is fixed to the rocket 10 and forced to rotate with the spin of the rocket. During one revolution of rocket spin, flywheel axis 68 will twice be colinear with rocket tumble angular velocity vector 20 as shown in FIG. 6. The flywheel is also shown in FIG. 6 in the process of rotation, the direction of rotation being indicated by curved arrow 70, and the associated flywheel angular momentum being indicated by vector 72. In the second embodiment of the invention, flywheel 66 is alternately torqued by a motor in the direction of rotating flywheel axis vector 68 and in a direction opposite to the direction of flywheel axis vector 68.

The direction of torque is determined by the instantaneous position of rocket 10 about its spin axis 18. The alternate positive and negative torques applied to flywheel 66 result in the flywheel angular momentum vector 72 alternately becoming more positive and less positive, so that in essence, the angular momentum fluctuates between two values. It is immaterial to the operation of the invention what the two values of angular momentum are; that is, there is little difference in flywheel angular momentum fluctuations between values +M and —M as compared to fluctuations between 0 and 2M. The system analysis which will be subsequently made corresponds to flywheel angular momentum fluctuations between values 0 and 2M.

FIG. 7 illustrates one method for controlling rotation of flywheel 66. The flywheel shaft 74 is mounted in bearings 76 such that the shaft is perpendicular to the spin axis of the rocket. Bearings 76 are positioned so that the shaft axis lies along imaginary vector 68 in the rocket as indicated in FIG. 6. Also mounted in the rocket is a rate gyro 78 which measures the instantaneous direction of rocket rotation about vector 68 which is entirely distinct from rocket spin about longitudinal axis 18. Rate gyro 78 can be placed in any location in the rocket but it must be oriented so that it measures the rotation of the rocket about an axis which is parallel to the axis of the flywheel. As the gyro detects relative movement about vector 68, it causes a positive or negative signal to be generated which is a measure of the direction and amount of angular velocity of the rocket about vector 68. A positive signal is produced when flywheel axis 68 is pointing the same direction as rocket tumble angular momentum vector 20, and a negative signal when it is pointing opposite thereto. The gyro is energized from power supply 80, and the gyro output signal is amplified by amplifier 82. The amplifier signal provides a positive or negative signal to motor 84 which motor controls the direction and magnitude of the torque applied to the flywheel. Thus the combination of rate gyro, power supply amplifier and torque motor result in an alternating angular acceleration of the flywheel phased with the spin of the rocket. Since the integrated angular acceleration of the flywheel during one-half of the rocket spin period is equal and opposite to the integrated angular acceleration of the flywheel during the second half of the rocket spin period, no substantial angular velocity is accumulated by the flywheel. A magnetic eddy current viscous damper 86 is provided to gradually damp any small cumulative rotation of the flywheel due to the unbalance of the torque cycle during the rotation of flywheel 66. The strength of the magnet 86 used is determined by the surface area and conductivity of flywheel 66 that is contained between the magnet poles.

In operation, at time $t_1$ rocket 10 is in the position shown in FIGS. 1 and 6 with its longitudinal axis colinear with vector 18. The instantaneous motion of the rocket consists of a spin about vector 18, indicated by arrow 12, and a rotation about imaginary vector 20 in the direction indicated by arrow 21. That is, the front end of the rocket is moving away from the viewer while the rear end is moving toward the viewer. This instantaneous rotation of the rocket is represented by rocket tumble angular momentum vector 20 in accordance with the right hand rule, which shows the magnitude and direction of this portion of the angular momentum of the rocket.

An important component of this embodiment of the present invention is now considered, namely, flywheel 66 which is mounted on an axle whose longitudinal axis 68 is shown instantaneously colinear with imaginary vector 20 but pointed in the −20 direction. A torque is applied to the flywheel when rocket 10 is in the position shown in FIG. 2 to cause rotation of the flywheel in a direction opposite to the direction of arrow 70 shown in FIG. 6. No external force is applied to the rocket, and rotation of flywheel 66 does not alter the angular momentum of the combined rocket-flywheel system. Rotation of the flywheel in the −70 direction with the rocket in the position shown in FIGS. 1 and 2 has the effect of increasing the angular momentum of the rocket in the direction of vector 20 and of adding to the momentum of the flywheel in the direction 68. Step 1 in the operation of this embodiment of the invention is completed when flywheel 66 acquires angular momentum in the direction of vector 68.

The second step in operation occurs during spin of rocket 10 through one-half of a revolution from the position shown in FIGS. 1 and 6. In this one-half revolution, vector 68, which is fixed inside the rocket and rotates with the rocket, moves from alignment in the direction opposite to vector 20 to alignment in the direction of vector 20. Flywheel rotation is now in the direction of arrow 70. Movement of the flywheel through one-half a revolution of rocket spin involves applying a torque to the flywheel axis, at bearings 76 thereof shown in FIG. 7. Such a torque on the axis includes a reaction torque on rocket 10, the average direction of application of which is opposite that of vector 20. The reaction torque may be considered a braking torque on the precession of the rocket, and the magnitude of such braking torque is such that it produces a decrease in the rocket tumble angular momentum vector 20, which decrease is twice the magnitude of the increase which occurred during Step 1. The initial spin up of the flywheel involves transfer of a fixed quantity of angular momentum from the rocket to the flywheel, which quantity is vectorially opposite that of tumble angular momentum vector 20 or in the −20 direction. During Step 2, the direction of the fixed quantity of angular momentum changes direction from the −20 direction to the +20 direction and is of the same magnitude. By vector subtraction, the final fixed quantity of angular momentum less the initial fixed quantity of angular momentum shows that the change in the fixed quantity of angular momentum during Step 2 is a vector equal to 2 times the magnitude of the fixed quantity of angular momentum. Hence, the decrease in rocket tumble angular momentum during Step 2 is twice the increase produced by Step 1. Such movement of vector 68 completes the second step in operation of the invention.

In the third step, the rate gyro shown in FIG. 7 senses a rotation of the rocket about vector 68. This rotation is again in the direction of vector 20 but since vectors 20 and 68 are now pointing in the same direction, the rate gyro produces a signal of opposite polarity to that produced in Step 1, the circuitry of FIG. 7 then causes a torque to be applied to flywheel 66 counter to the direction of rotation established in Step 1. This latter torque reduces the momentum of the flywheel to essentially zero and concludes operation under Step 3. The reaction torque on the rocket increases the tumble angular momentum of the rocket as in Step 1.

Step 4 includes the portion of spin during which vector 68 is moving from the direction of vector 20 to a direction opposite to that of vector 20. Since little or no angular momentum is contained in the flywheel during Step 4, the flywheel exerts negligible torque on the rocket during this final half of a spin period. It is important to note that during Steps 1 and 3 the tumble angular momentum of rocket 10 about vector 20 was increased and during Steps 2 and 4 the tumble angular momentum of the rocket was decreased or left unchanged. If during Steps 2 and 4 the precession of the rocket about yaw cone 24 is neglected, the increase in rocket tumble angular momentum during Steps 1 and 3 is exactly cancelled by the decrease in rocket tumble angular momentum that occurred during combined Steps 2 and 4. If the effect of precession of the rocket 10 along the yaw cone 16 is included, however, it can be demonstrated that the yaw cone angle $x$ is decreased. This decreasing of yaw cone angle is brought about by the momentum-wise equivalence of the embodiment of the invention as shown in FIGURES 6 and 7 to the embodiment first described, the performance of which has already been analyzed. The effect of rocket precession is to increase the time during which the rocket stays in Step 2 over the time that the rocket would have stayed in Step 2 without precession. This increase in time is caused by the fact that during Step 2 the rocket will have moved a small amount around the yaw cone. Thus direction 20 will have changed slightly in inertial space. As a result, a rotation of the rocket in excess of 180° will be required to carry the flywheel angular momentum vector from the −20 direction to the +20 direction. However, during this extended period of Step 2 rotation, the magnitude of torque applied by the precessing flywheel is identical to that which would have been applied to the rocket in the non-precession case. But since the time of torque application is slightly greater, the effect on rocket tumble angular momentum is also greater. Hence, the total decrease in rocket angular momentum during Step 2 is slightly greater in magnitude than the increase in rocket angular momentum occurring in the sum of Steps 1 and 3. Thus repetitive application of Steps 1–4 results in decrease of rocket cone angle $x$.

It will now be shown that the embodiment of FIGS. 6 and 7 does indeed simulate the first embodiment of the invention as described in FIGS. 2, 3, 4, and 5. Referring now to FIGS. 8a and 8b, there are shown two sets of six top views of the precession cone 16. The top set, FIG. 8a, of six top views, corresponds to the embodiment of the invention described in FIGS. 2, 3, 4, and 5. The bottom set, FIG. 8b, of six top views, corresponds to the embodiment of the invention described in FIGS. 6 and 7. Each part of FIG. 8 shows an end-on view of the rocket total angular momentum vector 14, the path of the rocket tip during precession 16 and the flywheel angular momentum vectors 26 and 72. Each of the six drawings of the top set shows the orientation of vector 26 at a different time during a single spin rotation. For simplicity, each of the top six views are spaced apart in time by ⅙th of a spin period. These six times have been selected to correspond to rotation angles $\alpha$ of 30°, 90°, 150°, 210°, 270°, and 330°, where the rotation angle $\alpha$ is the angle between a reference vector rotating with the rocket and rocket tumble angular velocity vector. In the first embodiment a vector colinear with structural member 52 in FIG. 4 is chosen as the reference vector; in the second embodiment flywheel axis vector 68 is chosen as a reference vector. All six of the top set of views 8a are identical, since in the first embodiment of the invention the flywheel axis 26 is maintained tangent to the rocket precession path 16. In the bottom set when rotation angle $\alpha$ is near zero, Step 1 takes place giving flywheel 66 angular momentum in the vector 68 direction. Let us assume Step 1 is complete before $\alpha$ reaches 30°. At $\alpha = 30°$ flywheel angular momentum vector 72 is pointed below the plane perpendicular to rocket total angular momentum vector 14 and substantially in the direction indicated. At $\alpha = 90°$ vector 72 lies in the plane perpendicular to vector 14 and points in the same direction that vector 26 pointed in FIG. 8a. At $\alpha = 150°$ vector 72 points above the plane perpendicular to vector 14 by the identical amount which it pointed below the plane at $\alpha = 30°$. During the process of rotation from $\alpha = 30°$ to $\alpha = 150°$ the length of vector 72 has not changed. Between $\alpha = 150°$ and $\alpha = 210°$ Step 3 takes place and angular momentum vector 72 is reduced to zero. Angular momentum vector 72 remains zero throughout the remainder of the rotation cycle. The net effect of the torque rotation cycle thus is to produce within the rocket a rotating flywheel whose time average angular momentum vector is pointed along the cone precession flight. Thus the cumulative effect of the embodiment of FIGS. 6 and 7 of the invention is identical in nature to that produced by the embodiment of FIGS. 2–5.

There is thus provided a rocket stabilizer that operates to reduce the yaw cone angle of a spinning rocket without the application of external torques. All components of the stabilizer are contained within the rocket and are completely isolated from the rocket's external environment.

Operation of the stabilizer may be generally considered as a transfer of angular momentum from an axis transverse to the rocket body to an axis along the rocket with no attendant alteration of the system's total angular momentum. The transfer of angular momentum is accompanied by a change in the angular kinetic energy of the rocket system. The additional energy required to place the rocket in a maximum energy condition is obtained from the power supply source, and may be a battery or other means for providing electrical potential. In the energy aspect, it is noted that the present invention acts in a manner which is the reverse of damping rings, the latter being used in the prior art to ensure that rockets or satellites rotate about their largest moment of inertia.

The present invention may, by a minor adjustment, be used to provide a system which will increase the yaw cone angle to a maximum of 180° and put the rocket in a pure flat tumble. To accomplish this, it is necessary only to interchange the leads between the power source and the rate gyro.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A device for reducing the yaw cone of a spinning and precessing rocket comprising:
    (a) support means including a shaft, said support means being rotatably mounted within said rocket on an axis coaxial with the rocket spin axis so as not to partake of the spin of the rocket shell,
    (b) a continually rotating momentum means mounted on said shaft and rotatable with said support means,
    (c) angular rate sensing means on said support for detecting tumble of said rocket about said shaft, said angular rate sensing means producing an output signal according to the tumble of said rocket, and
    (d) torque producing means receiving said signal produced by said angular rate sensing means for applying a torquing force to said support whereby said shaft is maintained in a position tangent to the yaw cone of said rocket.

2. A device for applying a corrective torque to a spinning and precessing rocket having an outer shell surface to reduce the yaw cone angle thereof comprising:
    (a) support means mounted within said rocket for rotation about the spin axis of said rocket,
    (b) momentum means mounted on said support means and rotatable therewith for rotation about an axis perpendicular to the spin axis of said rocket,
    (c) sensing means on said support means for detecting tumble angular momentum about the axis of rotation of said momentum means, said sensing means producing an output signal according to the tumble of said rocket, and
    (d) torque producing means between the rocket shell and said support means electrically connected with said sensing means to receive signals from said sensing means for transferring tumble angular momentum detected by said sensing means into increased spin angular momentum of said rocket shell.

3. A device for applying a corrective torque to a spinning and precessing rocket to reduce the yaw cone angle thereof comprising:
    (a) yoke means rotatably mounted within said rocket,
    (b) rotatable flywheel and shaft in said yoke means mounted for rotation about an axis perpendicular to the spin axis of said rocket,
    (c) a first motor fixed to said yoke means and connected to drive said shaft and flywheel,
    (d) a second motor rigidly secured to said yoke means,
    (e) a support member rigidly secured to the rocket body and having an extension thereon providing both the rotary mounting for one end of said yoke means and the armature axle for said second motor,
    (f) angular rate sensing means mounted on said yoke means, and
    (g) a power source for continually supplying power to said first motor and said angular rate sensing means, said second motor being responsive to signals of either polarity from said angular rate sensing means to maintain the angular momentum vector of said flywheel tangent to the yaw cone of said precessing rocket.

4. A device for applying a corrective torque to a spinning and precessing rocket to reduce the yaw cone angle thereof comprising:
    (a) support means mounted within said rocket for rotation about the spin axis of said rocket,
    (b) a flywheel and shaft mounted on said support means for rotation about an axis perpendicular to the spin axis of said rocket,
    (c) a first motor on said support means connected to drive said shaft and flywheel,
    (d) a second motor rigidly secured to said support means,
    (e) a support member rigidly secured to the rocket body and having a leg portion providing both the rotary mounting for one end of said support means and the armature axle for said second motor,
    (f) a control circuit and rate gyro mounted on said support means, and
    (g) a power source for continually supplying power to said first motor and said rate gyro, said control circuit being connected to amplify signals of either polarity from said rate gyro to drive said second motor when said rate gyro senses tumble angular momentum of said rocket about said shaft.

5. A device for applying a corrective torque to a spinning and precessing rocket to reduce the yaw cone angle thereof comprising:
    (a) a rectangular yoke mounted within said rocket for rotation about the spin axis of said rocket,
    (b) a rotatable shaft across said yoke mounted for rotation on an axis perpendicular to the spin axis of said rocket,
    (c) a flywheel mounted on said shaft,
    (d) a constant speed flywheel motor on said yoke connected to drive said shaft and flywheel at a constant speed and in a single direction,
    (e) a yoke motor rigidly secured to said yoke,
    (f) an inverted T-shaped member rigidly secured to the rocket body, the leg portion of said T-shaped member providing both the rotary mounting for one end of said yoke and the armature axle for said yoke motor,
    (g) A control circuit and rate gyro mounted on said yoke, said rate gyro being positioned to detect tumble angular momentum about said shaft, and
    (h) a power source for continually supplying power to said flywheel motor and said rate gyro, said control circuit being connected to amplify signals of either polarity from said rate gyro to drive said yoke motor thereby torquing said yoke to a position whereby the angular momentum vector of said flywheel will point in a direction tangent to the yaw cone.

References Cited by the Examiner

UNITED STATES PATENTS 2,856,142 10/58 Haviland _____ 244—79 X
2,857,122 10/58 Maguire _____ 244—79 X
2,963,243 12/60 Rothe.
3,048,108 8/62 Roberson et al. _____ 102—50

FOREIGN PATENTS 863,457 3/61 Great Britain.

BENJAMIN A. BORCHELT, *Primary Examiner.*

SAMUEL FEINBERG, *Examiner.*